Patented Apr. 21, 1942

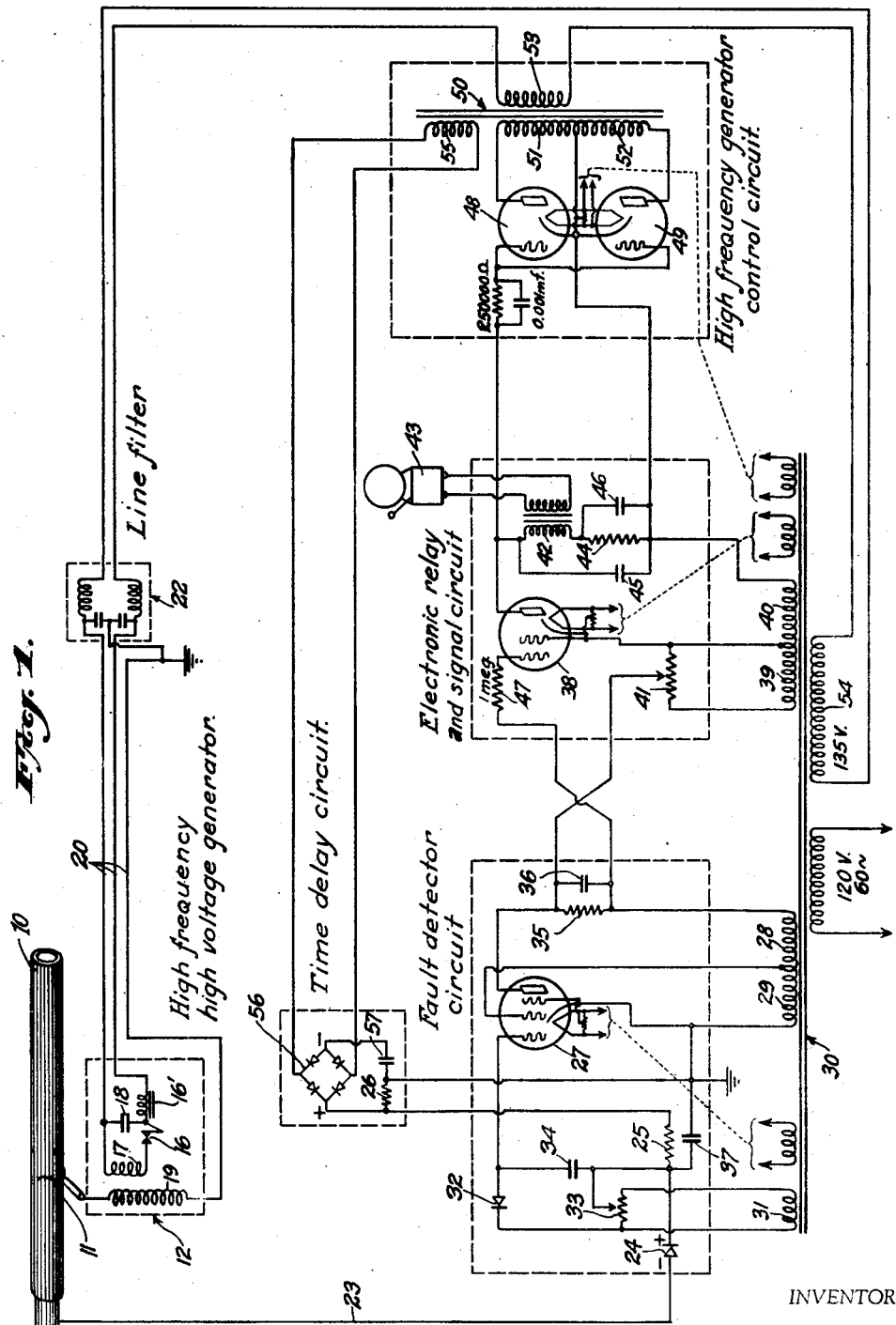

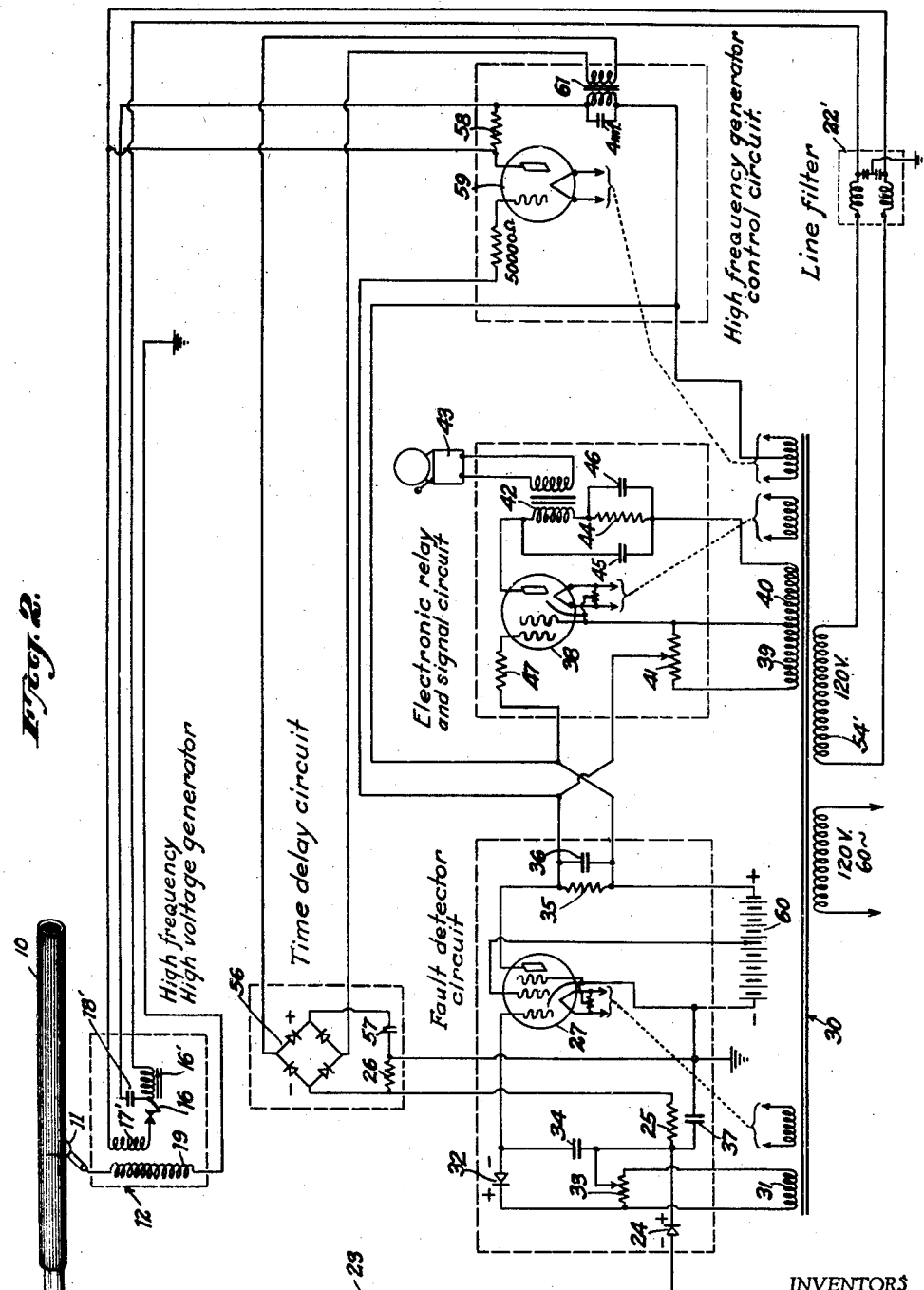

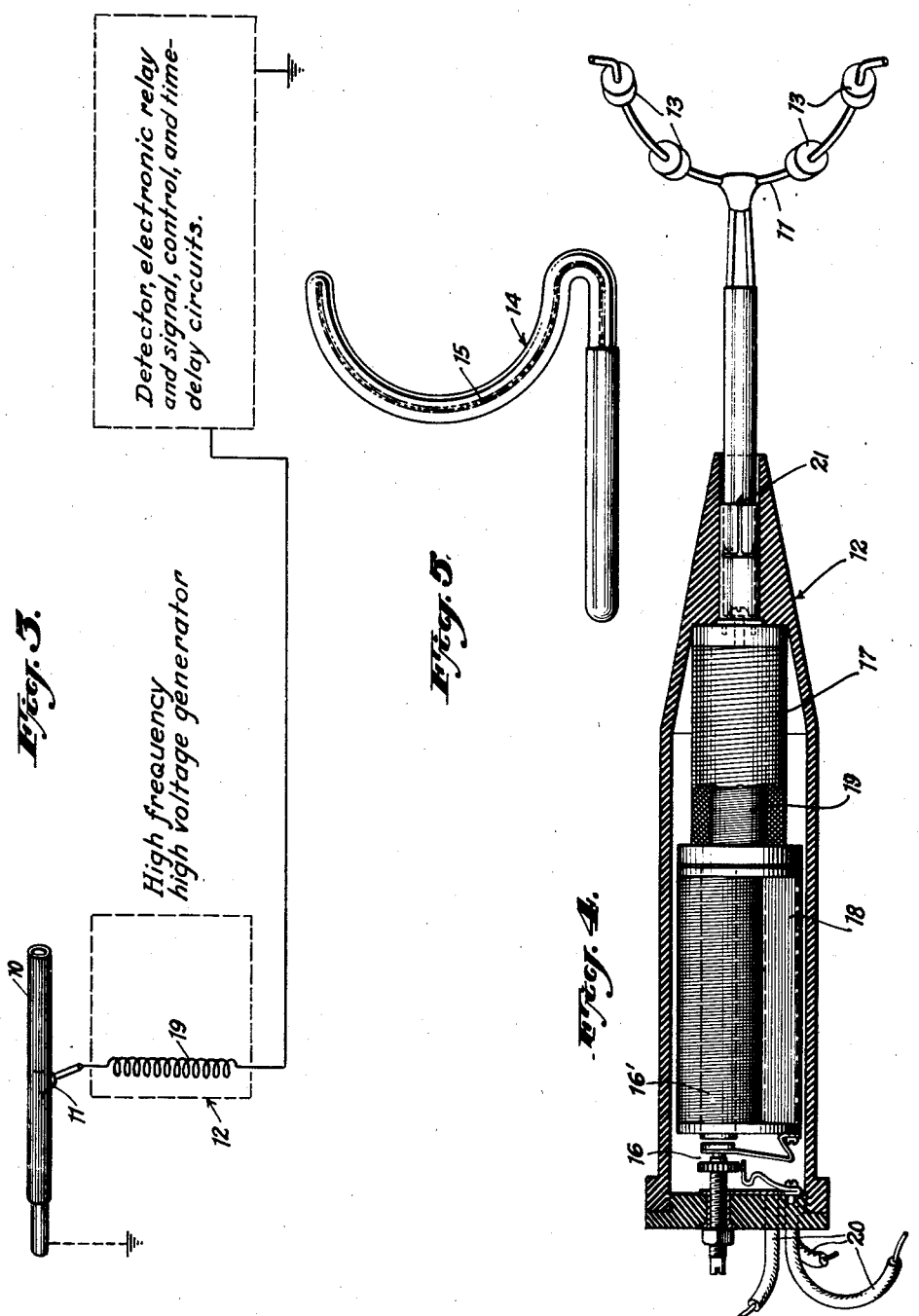

2,280,119

UNITED STATES PATENT OFFICE 2,280,119

METHOD AND APPARATUS FOR ELECTRICALLY TESTING PROTECTIVE COATINGS AND THE LIKE

Lawrence J. Gorman, Bogota, N. J., and Richard L. Morris, Richmond Hill, N. Y., assignors to Consolidated Edison Company of New York, Inc., New York, N. Y., a corporation of New York Application September 21, 1940, Serial No. 357,706

12 Claims. (Cl. 175—183)

This invention relates to methods and apparatus for electrically testing materials such as non-metallic protective coatings applied to metallic surfaces and is especially adapted for testing protective compounds or coatings applied to pipe for protection against corrosion. In particular, the invention involves methods and means for detecting the presence of faults, voids, and weak spots in such coatings, without materially carbonizing or otherwise impairing the protective properties of the coatings.

In certain locations on underground piping systems, gas distribution systems for example, it is necessary to coat the pipe with a protective coating, for the purpose of preventing the destruction of pipe through electrical, chemical, or micro-biological action. It is important that such coatings be free of any faults, voids or weak spots which might be responsible for localized corrosion at such points. The present technique for wrapping pipes at the mill and coating pipes or joints in the field, and the possibility of damage during transit, is such that it is desirable to have available both at the manufacturing plant and at the installation location, a means for testing said coatings.

For testing insulating material, devices utilizing high test voltages at both high and low frequencies applied to electrodes in more or less direct contact with the material being tested, have been heretofore used. But if these prior devices are applied to such problems as the testing of protective coatings on pipe, there will be serious danger of injury to the coating, which may or may not consist of material which is a good dielectric and, therefore, not generally susceptible to a dielectric test. From an economic viewpoint, it is not always desirable to reject pipe having certain minor flaws in the coating, which have been shown by experience to cause only negligible corrosion. It is therefore desirable to insure that the testing methods be such as to not render the flaws more serious than prior to the tests. Accordingly an important feature of the present invention comprises the provision of methods and equipment capable of electrically detecting flaws, even of a minute nature, without danger of materially carbonizing or otherwise deteriorating or enlarging the flaw areas. In carrying out the invention, provision is also made for using a test voltage of frequencies of the order of 100 kilocycles or higher so as to minimize the possibility of an unpleasant shock to either the operator or other persons, which might be hazardous or be indirectly responsible for secondary accidents, should bodily contact be established with the test circuit. With the preferred forms of the invention, means may be provided for utilizing a high voltage discharge to ionize the air immediately over the coating and in voids (if any are present) rather than using a continued direct application of a test voltage to the material which may or may not be a good dielectric.

The discharge is preferably obtained according to one form of the invention by energizing an electrode enclosed in a glass tube or other material having high dielectric properties. The electrode may be held in close proximity to the coating under test and if the coating is uniform, the discharge will spray in a uniform pattern under the electrode. Where there is a void in the coating, the discharge will tend to concentrate at that point, thus indicating the location of the void. When the discharge is concentrated at a void or other defect in the coating, considerable heat may in some cases be produced which may tend to burn the material. Accordingly a further feature of the invention in its preferred forms resides in the provision of means for automatically and immediately interrupting the test voltage when a fault is reached, to prevent burning the material.

Various further and more specific objects, features and advantages of the invention will more clearly appear from the detailed description given below taken in connection with the accompanying drawings which form a part of this specification and illustrate merely by way of example certain preferred forms of the invention. The invention consists in such novel features, arrangements, methods and combinations as may be hereinafter disclosed and claimed.

Figs. 1, 2 and 3 respectively diagrammatically show three alternative circuit arrangements for carrying out the invention;

Fig. 4 is an elevational view partly in section of one type of a high frequency generator assembly and attached electrode for use with the invention; and Fig. 5 shows an alternative form of electrode.

In the particular arrangement illustrated in Fig. 1, the coated pipe 10 under test is insulated from ground and the high frequency test voltage is applied to the protective coating by an electrode 11 preferably suitably shaped and mounted upon a high frequency generator assembly indicated generally at 12 (Figs. 1, 4). This electrode may encircle approximately one-half of the pipe periphery, and may be made of flexible wire if desired so as to conform generally to the shape of the pipe and any incidental surface irregularities. If desired, also the electrode may be provided with a number of spaced insulating rollers or spacers as at 13 for preventing direct contact of the electrode with the coating being tested. It is understood that these may be omitted if desired. This electrode preferably also has a small surface area so as to reduce the high frequency charging current to a minimum. In another form, as at 14 (Fig. 5), the electrode may be enclosed in a glass tube or other transparent material of high dielectric properties, and further the tube may be filled with conducting fluid 15, constituting a part of the electrode. The member 14 if desired may be made of a transparent plastic material, such for example as so-called Lucite having the property of transmitting light along the curved path of the member and out of the ends thereof, so that if the amount of light produced is increased at any point along the electrode, as upon the location of a flaw, such increased amount of light will be visible to the operator even though the electrode may at the time be largely obstructed from view beneath the pipe.

The high frequency, high voltage generator, preferably mounted as shown in Fig. 4, in a small insulated casing adapted to be held in the hand, may consist of a vibrator 16 operated by an induction coil 16', an oscillating circuit of inductance 17 and capacitance 18, and an air-core voltage step-up coil 19. The operating voltage supply and ground connections may be contained in a three conductor cable 20 of suitable length. The electrodes and casing may be formed with quick-detachable plug and socket connections, if desired, as at 21. One example of the generator as used, supplies an open circuit potential of approximately 20 kilovolts, having a lowest component frequency of approximately 300 kilocycles. With this example the coil 17 has inductance of about 6 microhenries and the condenser 18 a capacity of about 0.05 microfarad. The test potential of 20 kilovolts is for example reduced to approximately 10 kilovolts when the test electrode is applied adjacent to the insulating coating.

A filter circuit 22 (Fig. 1) shown in the supply leads of the high frequency generator may not be at all times necessary, but may be found desirable to prevent high frequency surges from being fed into the detector circuits hereinafter described.

The various tube circuits of the embodiment of the invention diagrammatically illustrated in Fig. 1 will now be described, it being understood that the constants and detailed particulars given as to the various units of the circuits are merely illustrative examples.

The high frequency currents flowing from the pipe 10 along connection 23 may be rectified in a copper oxide half-wave rectifying unit 24 and then passed to ground through resistors 25 (4 megohms) and 26 (1 megohm). A screen grid vacuum tube 27 (of a type known in the trade as R. C. A. 57, for example) serves as a detector and has plate and screen electrodes which may be supplied from two 120 volt windings 28 and 29 on a power transformer 30. The voltage drop across the resistors 25 and 26 normally tends to apply a positive bias to the control grid of the detector tube. A 25 volt winding 31 on the transformer 30, together with a half-wave copper oxide rectifier unit 32, a 2500 ohm potentiometer 33, and a 4 microfarad condenser 34, all constitute a compensating circuit. This compensating circuit tends to apply a negative bias on the detector tube sufficient to compensate for the normal continuous flow of high frequency charging current. The potentiometer 33 also may function as a sensitivity control. When the test electrode 11 passes over a fault, the additional rectified current flowing through resistors 25 and 26 applies a net bias on the detector tube, resulting in a flow of plate current through a resistor 35. The voltage drop across resistor 35 (50,000 ohms) and a capacity 36 (0.01 mf.) then operates the "electronic relay and signal circuit."

In the detector circuit a small amount of capacitance as at 37 to ground is ordinarily required, but this capacitance is preferably kept as small as possible (0.01 mf. for example) to reduce time delay in the operation of the detector. In lieu of the power transformer it will be understood that either a battery or a suitable direct current power pack operated from an alternating current supply, may be used to provide a direct current voltage supply for the detector tube if desired. Since the detector as above described operates only during the positive half cycles of the supply voltage, this may entail a possible time lag and consequently a direct current voltage supply is in some cases preferable as illustrated and further described hereinafter in connection with Fig. 2.

The electronic relay and signal circuit may utilize a low grid-current gas tetrode 38 (for example a so-called R. C. A. type 2051) supplied from two 220 volt windings 39 and 40 of transformer 39. The net bias supplied to the control grid of tetrode 38 is the resultant voltage drop across resistor 35 and a potentiometer 41 (which may have a resistance of 7500 ohms). The potentiometer 41 which may serve as a secondary sensitivity control, is so adjusted that when the plate current in the detector tube increases to some predetermined value readily determined by trial, the plate of the gas tetrode starts to conduct current. A transformer 42 in the tetrode plate circuit may be used to operate a signal such as a bell 43, thereby giving an indication to the operator when the test electrode 11 is passing over a fault in the pipe coating. The transformer 42 may be of a suitable type of output transformer having a primary to match a 3000 ohm impedance and a secondary to match an 8 ohm impedance, for example. The remaining resistor and capacitor network in the tetrode plate circuit consisting of resistor 44 (1000 ohms), capacity 45 (4 mf.) and capacity 46 (2 mf.) may be used to obtain a suitable control voltage for the "high frequency generator control circuit."

If it is desired to overcome any time lag arising from the A. C. power supply for the gas tetrode signal circuit, it will be understood that the signal circuit arrangement shown may be similarly replaced with suitable circuits using a direct current plate supply.

The voltage supplied to the high frequency generator may be controlled by the operation of gas triodes as at 48 and 49 (for example so-called R. C. A. type 885). These triodes when normally conducting, load the primary 53 of a transformer 50. This transformer as shown may be provided with three 120 volt windings 51, 52 and 53. Under these conditions the voltage drop across the primary is sufficiently low so that normal voltage is applied to the high frequency generator. When the gas tetrode 38 conducts, as a result of detecting a fault, a control voltage established in its plate circuit causes de-ionization of gas triodes 48 and 49, resulting in a large voltage drop across the primary winding 53 of transformer 50, and a consequent reduction in the voltage supply to the high frequency generator. This reduction in supply voltage is sufficient to stop the operation of the generator, thus stopping the discharge at the fault before substantial injury of the coating material can occur. Power for the high frequency generator may be supplied from a 135 volt winding as at 54 on transformer 30 as shown. The use of two gas triodes as at 48 and 49 in a full-wave circuit is here shown merely as an example of a satisfactory form of high frequency generator control circuit and it will be understood that other forms of circuits for the purpose may be substituted.

In order to prevent the test voltage from being successively applied to the fault or flaw detected with the above described circuit, before the operator has time to move the test electrode away from the defective area, a "time delay circuit" as shown in Fig. 1 may be employed. Such a circuit may include for example a 50 volt winding 55 on transformer 50, a full-wave copper oxide rectifier 56, the resistor 26, and a 1 mf. capacity 57. When the gas tubes 48 and 49 de-ionize as a result of detecting a fault, the voltage on transformer winding 55 increases, resulting in a flow of D. C. charging current through resistor 26. The voltage drop across resistor 26 is such that it applies a positive bias to the control grid of the detector tube 27 as long as the charging current flows. This results in a suitable time lag in the operation of the high frequency generator and the duration of this lag may be adjusted by selecting proper values for or by adjusting of values of resistance 26 and capacity 57.

An alternative method of controlling the high frequency generator is shown by the diagram of Fig. 2. With this arrangement the detector and signal circuits may be the same or similar to those of Fig. 1, but a different principle is utilized to cut off the high frequency test voltage.

Even though the high frequency generator supply with the circuits of Fig. 1 is interrupted as soon as the detector tube operates, a small amount of energy may still be stored in the inductance 17 and capacity 18, which may result in a continuation of the test voltage for an appreciable period after the supply is interrupted. However, with the preferred arrangement of Fig. 2, further oscillations in the high frequency oscillating circuit are prevented almost immediately after the detector circuit operates. This may be accomplished as shown in Fig. 2, by placing in the oscillating circuit a series resistance 58 (100 ohms) which is larger than the critical resistance which would just permit oscillation with the values of inductance 17' and condenser 18' here used (50 microhenries and 0.05 mf. respectively in this particular example, oscillating at 100 kilocycles). The series resistance 58 is then shunted by a second variable resistance whose magnitude may be conveniently controlled. Such a device may take the form of a grid controlled mercury vapor tube 59 (a so-called Westinghouse type KU 627 thyratron, for example). When this tube is conducting, the net resistance is series with the inductance 17' and capacitor 18' is sufficiently low so as not to prevent the circuit from oscillating.

In normal operation the tube 59 is conducting and the high frequency generator oscillating circuit is functioning so as to generate a suitable test voltage in the step-up coil 19. However, when the test electrode 11 is passed over a fault or flaw, the flow of plate current in the resistor 35 applies a negative bias to the control grid of tube 59, which immediately cuts off and prevents further oscillation of the high frequency generator circuit. This method has an additional advantage in that the operation is quicker with the control tube 59 operated directly from the detector circuit as shown in Fig. 2. With the particular tube 59 above referred to, test frequencies such as 100 kilocycles, or at least somewhat lower than the 300 kilocycles mentioned for Fig. 1, may be necessary or advisable although the higher frequencies may be secured if the tube at 59 has a lower internal resistance. Also a lower circuit resistance may be obtained as well as quicker response by using two tubes as at 59 connected so as to give full-wave conduction in a manner which will be understood by those skilled in the art, and with the consequent possibility of using higher test frequencies.

In the detector circuit of Fig. 2, a 180 volt battery 60 with a 90 volt tap) is shown for illustrative purposes as the plate and screen supply and as above suggested in connection with Fig. 1, such a direct current supply may be preferred to obtain a minimum of time delay in the detector. This direct current supply need not necessarily be limited to a battery, and may if desired take the form of a D. C. power pack operating from the alternating current supply.

The time delay device circuit in Fig. 2 serving the same purpose as that described in connection with Fig. 1 may receive its supply from a transformer 61, which may be a suitable audio type transformer with a primary and secondary ratio of 6 to 1. The only difference between this time delay circuit and the one shown in Fig. 1 is that the condenser 57 in this circuit is normally charged. With the detection of a fault, the mercury vapor tube 59 stops conducting and the condenser 57 discharges through resistance 26. The voltage drop across resistance 26 during this period applies a positive bias to the detector tube as long as the discharge current flows.

In other respects the arrangement of Fig. 2 and its operation will be apparent from the diagram taken in connection with the above explanation of Fig. 1, corresponding parts in the two figures being identified by the same reference characters. For the method shown in Fig. 2 an additional conductor is required as shown in the connecting cable between the generator and the control equipment.

The arrangements of Figs. 1 and 2 are intended for the testing of pipe or other metal objects with non-conductive coatings or for the testing of insulation on metal or conductive objects, the latter being insulated from the ground. The schematic diagram of Fig. 3 illustrates the manner in which similar arrangements may be used for testing the coating on grounded pipe or other non-conductive or insulating material on grounded objects. In this method the detector circuit is placed in the ground lead of the high frequency generator, thus allowing the pipe or other object to be grounded. This serves as a convenient method of testing pipe coatings, when uncovered in the field or when the pipe is being installed and is lying on the ground prior to burying.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In the method of testing non-conductive material for the location of flaws by subjecting same to a high voltage discharge, the steps which comprise utilizing current resulting from the discharge at a flaw, to automatically check or discontinue the discharge at such flaw for a short interval, and also utilizing said current to establish another current effective to prolong such interval for substantially a predetermined short time after the checking or discontinuance of the discharge.

2. Apparatus for testing non-conductive material positioned on a conductive member, for locating flaws in the non-conductive material, including an electrode enclosed in material having high dielectric properties and adapted to be placed near the surface of the material under test, and means for generating high voltage, high frequency current and applying same to said electrode and conductive member, whereby a discharge is normally distributed as a fine spray over the area under test, the discharge being more concentrated to any point on said area where a flaw occurs.

3. Apparatus for testing non-conductive material positioned on a conductive member, for locating flaws in the non-conductive material, including an electrode enclosed in transparent material having high dielectric properties and adapted to be placed near the surface of the material under test, and means for generating high voltage, high frequency current and applying same to said electrode and conductive member, whereby a discharge is normally distributed as a fine spray over the area under test, the discharge being more concentrated and visible through said transparent material at any point on said area where a flaw occurs.

4. Apparatus for testing non-conductive material for locating flaws therein, including means for generating high voltage, high frequency current and for subjecting the area under test to a discharge therefrom, means for detecting current discharged through a flaw, means utilizing said current for controlling the operation of said generating means, to automatically suppress the discharge before substantial injury of the material at the flaw, and means actuated by said current for prolonging such suppression for a predetermined period after initial suppression of the discharge.

5. Apparatus for testing non-conductive material for locating flaws therein, including an oscillating circuit generator of high frequency current, means for subjecting the area under test to a discharge therefrom, means for detecting current discharged through a flaw, and means utilizing said current for increasing the resistance of the oscillating circuit while effectively maintaining connections to the source of energy for said generator, to thereby automatically suppress the discharge before substantial injury to the material at the flaw and whereby discharge at the flaw of stored energy in the circuit of such source is avoided.

6. Apparatus for testing non-conductive material for locating flaws therein, including an oscillating circuit generator of high frequency current, means for subjecting the area under test to a discharge therefrom, means for detecting current discharged through a flaw, means utilizing said current for increasing the resistance of the oscillating circuit, to thereby automatically suppress the discharge before substantial injury to the material at the flaw, and means controlled by said current for prolonging such suppression after initiation of the discharge through the flaw.

7. In the testing of non-conductive material for the location of flaws, the method which comprises normally applying to the material being tested, a discharge from a generator of high frequency, rectifying current resulting from the discharge through a flaw, and then utilizing such current to substantially suppress automatically the supply of high frequency from the generator while continuing to effectively maintain the circuit or circuits which supply the high frequency generator, thereby so reducing or discontinuing the discharge as to avoid injury of the material at the flaw.

8. Apparatus for testing non-conductive material for locating flaws therein, including means for generating high voltage, high frequency current and for normally subjecting the area under test to a discharge therefrom, means for detecting current discharged through a flaw, and means utilizing said current for controlling the operation of said generating means, to automatically suppress the discharge while continuing to effectively maintain the circuit or circuits which supply the high frequency generator, and before substantial injury of the material at the flaw.

9. The method of testing non-conductive protective coatings on metallic members, for the location of flaws by applying an electrical discharge thereto, which comprises: applying the discharge from an electrode, while interposing solid material having high dielectric properties between the electrode and coating, with the frequency and voltage of the discharge such that the discharge between said material and the coating, appears normally distributed as a fine spray over the area under test, and merely more concentrated to any point on the coating where a flaw occurs.

10. The method according to the foregoing claim 9, and with which the dielectric used has a high light transmission coefficient, thereby transmitting light from such more concentrated discharge to points of observation spaced from the flaw.

11. The method of testing non-conductive material for the location of flaws which comprises normally subjecting successive areas of the material under test to a high voltage high frequency discharge, and utilizing high frequency current resulting from the discharge through a flaw, to automatically suppress the high frequency current as supplied for such discharge while continuing to effectively maintain connections to the source of energy which generates the high frequency, whereby the discharge is reduced before causing substantial injury of the material at the flaw, and also whereby upon such suppression, discharge at the flaw of stored energy in the supply circuit or circuits is avoided.

12. The method of testing non-conductive material for the location of flaws which comprises normally subjecting successive areas of the material under test to a high voltage high frequency discharge, and utilizing high frequency current resulting from the discharge through a flaw, to automatically increase the impedance of the source of such high frequency while continuing to effectively maintain connections to the source of energy which generates the high frequency, whereby the discharge is reduced before causing substantial injury of the material at the flaw, and also whereby upon such reduction, discharge at the flaw of stored energy in the supply circuit or circuits is avoided.

LAWRENCE J. GORMAN.
RICHARD L. MORRIS.